Feb. 20, 1934. J. A. GOODEY 1,947,710
LUBRICATING APPARATUS
Filed April 5, 1932
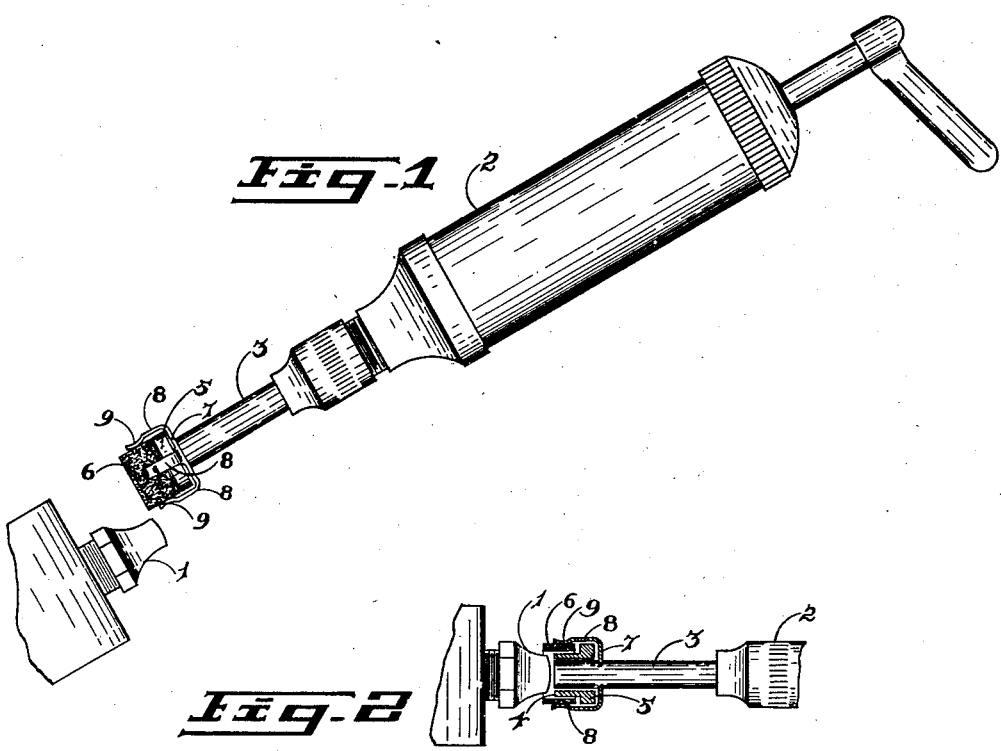
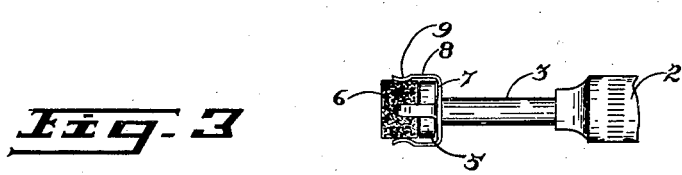
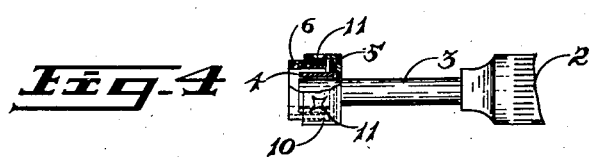

Patented Feb. 20, 1934

1,947,710

UNITED STATES PATENT OFFICE 1,947,710

LUBRICATING APPARATUS

John Albert Goodey, Dodsland, Saskatchewan, Canada

Application April 5, 1932. Serial No. 603,253

2 Claims. (Cl. 221—47.4)

My invention relates to improvements in lubricating devices more particularly having reference to wipers and like attachments for lubricating guns.

In the use of lubricating devices, more particularly grease guns or the like wherein grease or other lubricant is forced from a barrel having a plunger associated therewith for expulsion of the lubricant from a nozzle, the operator of the device is considerably inconvenienced in the application and use of the gun. In general the nipples, or like inlet openings in which the lubricant is to be injected, are more usually covered with dirt, particularly caked grease and foreign matter in adherence thereto, necessitating a separate wiping operation before the nozzle of the gun can be applied to the nipple for injection of the lubricant.

In addition a considerable proportion of the elements to be lubricated are located in places difficult to obtain access to making the cleaning operation of the nipple or inlet inconvenient, particularly as it becomes frequently necessary for the operator to use one hand for steadying himself in his movements around the machine.

In the present device I add to the nozzle of the grease gun, or like lubricating apparatus, a wiper of fabric or other cleansing material which can be passed across the face of the nipple for removal of foreign matter in adherence thereto. This permits cleansing the nipple and applying the lubricating device directly thereto, eliminating the preliminary separate operations more usually associated therewith in so far as cleaning the nipple or grease cup is concerned, and permitting to the operator free use of one hand for steadying or balancing purposes. In addition the grease gun serves as a handle for the wiper lessening the extent it is necessary to reach in carrying out the cleaning operation.

Other and more detailed objects of my invention will become apparent from the accompanying description taken in conjunction with the drawing wherein like characters of reference indicate like parts throughout the different views and wherein:

Fig. 1 is a side view of a grease gun with my improved wiper attached thereto and shown disposed in relationship to a grease cup or nipple preliminary to the wiping operation.

Fig. 2 is a detail view of a grease gun nozzle applied to a nipple, the nozzle being illustrated with a wiper attached thereto the latter being shown in section.

Fig. 3 is a side view of a grease gun nozzle with attached wiper.

Fig. 4 is a side view of a grease gun nozzle with attached wiper illustrating another method of attachment of the wiping fabric.

Having reference to the drawing 1 indicates a nipple or grease cup inlet and 2 a grease gun or lubricating device of which 3 is the nozzle for discharge of the lubricant. To the nozzle 3 I attach a cylindrical gland 4, which is sweated or otherwise suitably secured thereon, the said gland being formed with an annular shoulder 5. In the present showing I have illustrated the gun nozzle 3 as being in the form of a uniform tubular construction, but in as much as there is a considerable variation in the shape of the nozzle on different types of grease guns, the gland 4 would necessarily be formed to be fitted on the particular shape of nozzle to which the wiper would be applied. Thus, for example, where the nozzle is formed with an enlarged end the interior of the gland would be shaped complementary to be fitted thereon, but the exterior shape of the gland could remain substantially unchanged.

On the gland 4 is mounted a wiper 6, which is cylindrical in shape and made of fabric, or other flexible material suitable for cleansing purposes. The fabric 6 is dimensioned to extend slightly beyond the end of the gland 4 to provide a pliable protruding portion for application to the nipple to be cleaned.

For securing the wiper to the gland I provide a clamp consisting of a disc like body 7 with projecting resilient fingers 8 which extend forwardly over the shoulder 5 of the gland and are slightly inwardly bent at the tips as indicated at 9 to engage the wiper and secure it in place on the gland seated against the shoulder 5.

In Figure 4 is shown another form of clamp in which a band 10 replaces the resilient fingers, the said band being indented at intervals as indicated at 11 by punching openings therein and forcing projections, formed by the punching operation, into the fabric.

In the operation of the wiper, preliminary to applying the nozzle to the nipple for injection of lubricant from the gun, the gun is moved to carry the wiper across the face of the nipple to remove any dirt or foreign matter adhering thereto. When the nipple is cleaned the nozzle can be applied as usual. The separate operation of cleaning the nipple before bringing the gun into position is thus eliminated, in consequence of which the operator is only required to use one hand for greasing purposes. In addition to the greater freedom of movement permitted the operator the application of the wiper to the gun permits of more easily reaching grease cups in remote places as well as carrying out the wiping and greasing in a single operation.

What I claim is:

1. In a lubricating apparatus the combination with a lubricant gun having a nozzle for ejection of the lubricant into a receiving element, of a wiper for cleaning the receiving element preliminary to the lubrication thereof, said wiper comprising a piece of flexible material, and means for attachment of said piece of material to the nozzle of the gun projecting beyond the extremity thereof.

2. In a lubricating apparatus the combination with a lubricant gun having a nozzle for ejection of the lubricant into a receiving element, of a wiper for cleaning the receiving element preliminary to the lubrication thereof, said wiper comprising a cylindrical piece of flexible material, and means for attachment of said piece of material to the nozzle of the gun encircling said nozzle and projecting beyond the end thereof.

JOHN ALBERT GOODEY.